(12) United States Patent
Rabb

(10) Patent No.: US 7,924,447 B2
(45) Date of Patent: Apr. 12, 2011

(54) METHOD AND SYSTEM FOR WORKLOAD BALANCING

(75) Inventor: Khalid M. Rabb, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 795 days.

(21) Appl. No.: 10/345,438

(22) Filed: Jan. 15, 2003

(65) Prior Publication Data

US 2004/0136028 A1 Jul. 15, 2004

(51) Int. Cl.
*G06F 3/12* (2006.01)
*G06F 15/00* (2006.01)
*G06K 15/00* (2006.01)
*H04N 1/44* (2006.01)

(52) U.S. Cl. ...... 358/1.15; 358/1.9; 358/1.13; 358/1.16; 348/231.1; 348/231.2

(58) Field of Classification Search ............ 358/1.15, 358/1.16, 1.9, 1.1, 1.13, 1.14; 718/105; 709/208; 348/231.1, 231.2
See application file for complete search history.

(56) References Cited

U.S. PATENT DOCUMENTS 5,287,194 A * 2/1994 Lobiondo .................. 358/296
2001/0053947 A1 * 12/2001 Lenz et al. ................. 700/117
* cited by examiner

*Primary Examiner* — Thomas J Lett
(74) *Attorney, Agent, or Firm* — LeClairRyan

(57) ABSTRACT

A method and system for workload balancing includes determining which one of a plurality of printer devices satisfies at least one criteria and routing the job to the printer device which satisfies the criteria. The determining is carried out at one or more of the plurality of printer devices.

12 Claims, 2 Drawing Sheets

METHOD AND SYSTEM FOR WORKLOAD BALANCING

FIELD

This invention generally relates to methods and systems for workload balancing and, more particularly, to a method and system for workload balancing between a plurality of printers or other multifunction devices.

BACKGROUND

In a networked environment, a variety of computer work stations usually are coupled to a central server and a plurality of printers. Typically, each of the computer work stations is assigned to one of the printers and jobs from the work station are sent to the assigned printer unless the operator selects another printer for a particular printing job.

Although the networked environment described above works, it is inefficient because there is no management of the jobs being sent to the different printers. As a result, one printer may be backed up with either a large printing job and/or a number of jobs while other printers are available and unused.

SUMMARY

A method and a computer readable medium having stored thereon instructions for workload balancing in accordance with embodiments of the present invention includes determining which one of a plurality of printer devices satisfies at least one criteria and routing the job to the printer device which satisfies the criteria. The determining is carried out at one or more of the plurality of printer devices.

A system for workload balancing in accordance with embodiments of the present invention includes a job processing system in at least one of a plurality of printer devices and a routing system. The job processing system in at least one of a plurality of printer devices determines which one of the plurality of printer devices satisfies at least one criteria. The routing system in the at least one of the plurality of printer devices routes the job to the printer device which satisfies at least one criteria.

The present invention provides a number of advantages including providing an automatic system for balancing jobs or workloads among printers. Additionally, the present invention eliminates the need for a central server managing the work flow between available printers.

DETAILED DESCRIPTION

Figure 1:
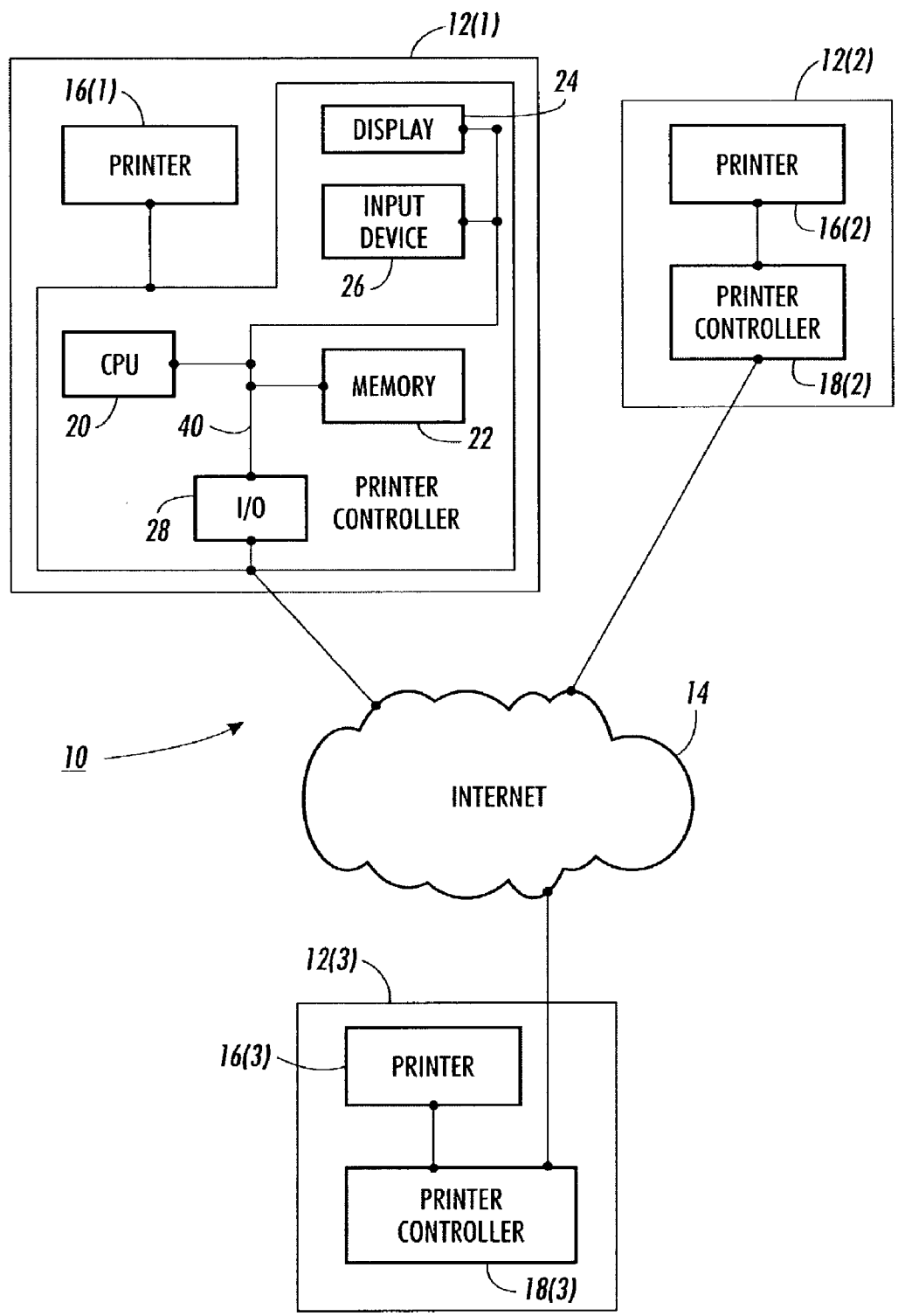
FIG. 1 is a block diagram of a system of printer devices in accordance with embodiments of the present invention.

A system 10 for balancing a workload between a plurality of printer devices 12(1)-12(3) in accordance with embodiments of the present invention is illustrated in FIG. 1. System 10 includes a plurality of printer devices 12(1)-12(3) coupled together by a network 14, although the system 10 may include different kinds and numbers of components. The present invention provides a number of advantages including providing an automatic system for balancing jobs or workloads among printer devices, such as printers or other multifunction devices Referring to FIG. 1, system 10 includes three printer devices 12(1)-12(3), such as printing or facsimile machines, although system 10 can include other numbers and types of devices. Each of the printer devices 12(1)-12(3) includes a printer or multifunction device 16(1)-16(3) and a printer controller 18(1)-18(3) that perform a variety of functions, such as printing operations and workload balancing, although other types and numbers of components and operations can be used and performed. Although the printer controller 18(1)-18(3) is shown with the printer or multifunction device 16(1)-16(3) in each of the printer devices 12(1)-12(3), other arrangements can be used, such as having the printer controller 18(1)-18(3) at another location, such as at a computer work station, separate from the printer or multifunction device 16(1)-16(3).

Each printer or multifunction device (1)-16(3) in the print devices 12(1)-12(3) is able to print received jobs on a print medium, such as a sheet of paper. A variety of different types of printers or multifunctional devices, such as ink jet and laser printers, could be used.

Each printer controller 18(1)-18(3) includes a processor 20, a memory storage device 22, a display 24, a user input device 26, and an input/output (I/O) unit 28 which are coupled together by a bus system 40 or other link, respectively, although the each printer controller 18(1)-18(3) may comprise other components, other numbers of the components, and other combinations of the components.

Figure 2:
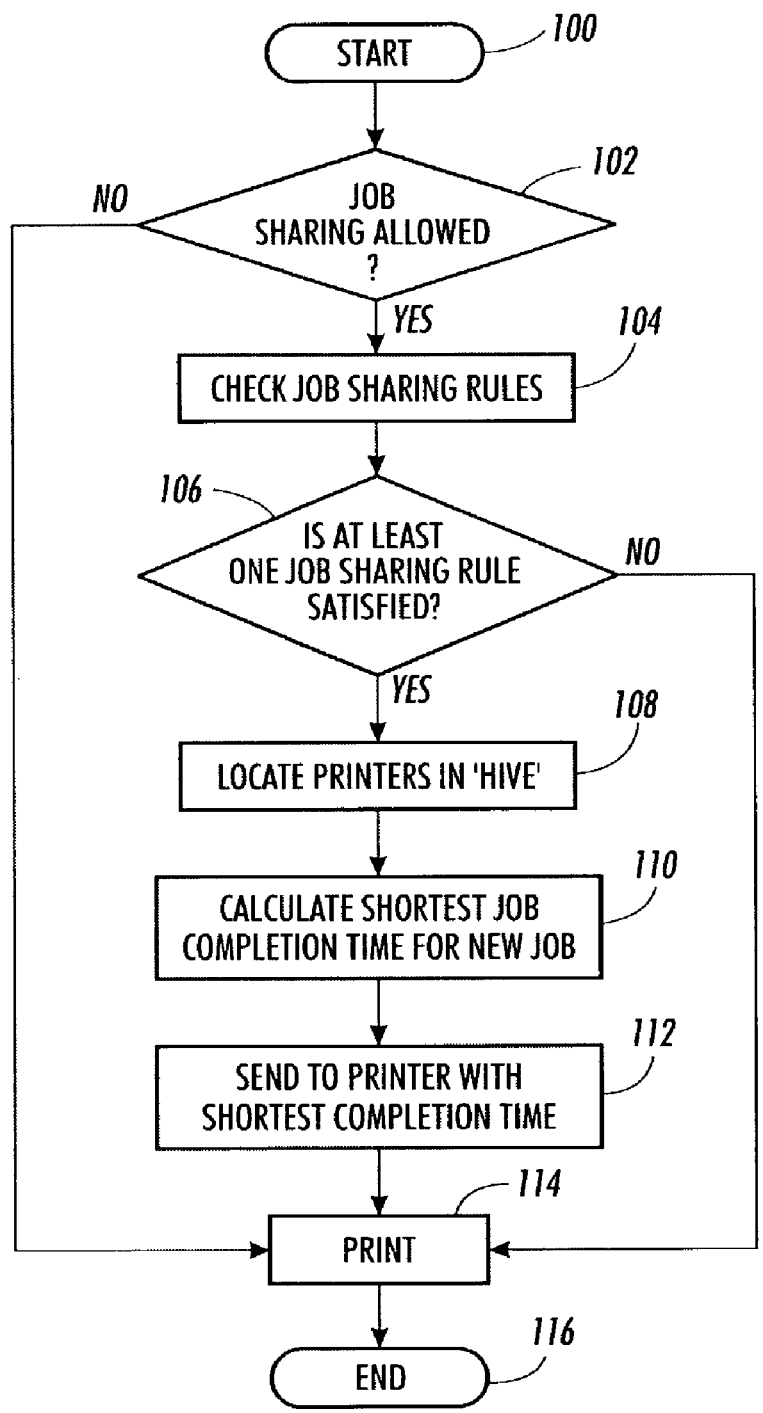
FIG. 2 is a flow chart of a method for workload balancing between a plurality of printer devices.

The processor 20 may execute one or more programs of stored instructions for the method for balancing workload in accordance with one embodiment of the present invention as described herein and illustrated in FIGS. 1-2. In this particular embodiment, these programmed instructions are stored in memory 22 and are executed by processor 20 in one of the printing devices 12(1)-12(3), although some or all of those programmed instructions could be stored and retrieved from and also executed at other locations. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 20, can be used for memory 22.

The display or graphical user interface 24 is used to show information to the operator, such as the work queue for a particular printer or the status of different. A variety of different of devices can be used for the display 24, such as a CRT or flat panel display.

The user input device 26 in each printer controller 18(1)-18(3) permits an operator to enter data into the corresponding printer controller 18(1)-18(3). A variety of different types devices can be used for user input device 26, such as a keyboard, a computer mouse, or an interactive display screen.

The I/O unit 28 in each printing device 12(1)-12(3) is used to couple the printing device 12(1)-12(3) to other components, such as other printer devices 12(1)-12(3) coupled to the network. A variety of different interface devices can be used with a variety of different communication protocols.

The network 14 is the Internet in this example, although other types of networks can be used, such as an a local area network, a wide area network, a telephone line network, a coaxial cable network, and a wireless networks can be used. The network 14 enables printer devices 12(1)-12(3) to communicate with each other and any other components with access to network 14.

The operation of the system 10 for balancing work load in accordance with embodiments of the present invention will now be described with reference to FIGS. 1-2. The operation starts at step 100 where a job, such as a print job, is received or otherwise obtained at one of the print devices 12(1)-12(3), such as print device 12(1).

In step 102, printer controller 18(1) determines whether sharing of the received job with the other print devices 12(2) and 12(3) in this example is permitted. For example, the print job may contain confidential material and thus may need to be printed at a printer or multifunction device 16(1) where access is restricted. If sharing of the job is not permitted, then the No branch is taken to step 114 where the job enters the queue for jobs at the printer or multifunction device 16(1), is eventually printed, and then this process ends at step 116. If sharing of this job is permitted, then the Yes branch is taken to step 104.

In step 104, the printer controller 18(1) in this example checks the rule or rules for sharing jobs at printer device 12(1). A variety of different types of job sharing rules can be evaluated by the printer controller 18(1). For example, the printer controller 18(1) may determine if the job would exceed a maximum for a work queue at the printer device 12(1) which received the job. The printer controller 18(1) may determine if the job would take longer to complete than a first period of time. The printer controller 18(1) may determine if the printer 16(1) which would print the received job is non-functional. The particular job sharing rule or rules considered can be customized for the particular application.

In step, 106, the printer controller 18(1) determines if at least one of the job sharing rules is satisfied, although other configurations can be used, such as requiring other numbers of job sharing rules to be satisfied before permitting the job to be satisfied. If at least one job sharing rule is not satisfied, then the No branch is taken to step 114 where the job enters the queue for jobs at the printer or multifunction device 16(1), is eventually printed, and then this process ends at step 116. If sharing of this job is permitted, then the Yes branch is taken to step 108.

In step 108, the printer controller 18(1) determines what other printer devices 12(2) and 12(3) are available for handling the job. A variety of different techniques can be used to determine what other printer devices are available, such as a polling technique via the network 14. The availability of each printer device 12(1)-12(3) can vary based on one or more factors which can be customized by the operator or system administrator. For example, one factor may simply be whether the printer devices 12(1)-12(3) is functional.

In step 110, based on the printer devices 12(2) and 12(3) are determined to be available, the printer controller 18(1) determines which of the available printer devices 12(1)-12(3) satisfies at least one criteria. For example, one criteria may be which of the available printer devices 12(1)-12(3) can complete the job in the shortest amount of time, although other types and number of criteria can be used. In this example, the printer controller 18(1) would check the queue at each of the printer devices 12(1)-12(3) and based on the number and size of the job or jobs at each printer device 12(1)-12(3) would determine which printer device 12(1)-12(3) could complete the job in the shortest amount of time.

In step 112, the printer controller 18(1) sends the job to the printer or multifunction device 16(1), 16(2), or 16(3) which satisfies the criteria. In this example, printer controller 18(1) has determined that printer device 12(2) would complete the job in the shortest amount of time, so the printer controller 18(1) sends the job via network 14 to the printer device 12(2). In step 114, the printer 16(2) prints the job and the operation for this job ends.

Accordingly, the present invention provides a system and method for balancing jobs or workloads among devices, such as printers or multifunctional devices 16(1)-16(3). Additionally, with the present invention the management of the workload takes place at each printer device, thus eliminating the need for a central server to manage the work flow.

While particular embodiments have been described above, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed processes to any order except as may be specified in the claims.

What is claimed:

1. A method for balancing a workload between a plurality of printer devices, comprising:
    providing a plurality of printer devices coupled together, wherein each printer device includes a printer controller adapted to interactively communicate with other printer devices;
    receiving a request for printing a job at a printer device in the plurality of printer devices; and
    determining with the printer controller in the printer device where the request is received whether the job can be shared based upon a confidential nature of the job, wherein the determining further comprises:
        printing the job with the printer device where the request is received when the job cannot be shared,
        identifying which one of the plurality of printer devices satisfies at least one criteria when the job can be shared, and
        routing the job to another printer device which satisfies the criteria,
    wherein the identifying which one of the plurality of printer devices satisfies at least one criteria further comprises:
        determining if one or more job sharing rules has been satisfied
        wherein the job sharing rules comprise:
        determining if the job would exceed a maximum for a work queue at the another printer device which received the job;
        determining if the job would take longer to complete than a first period of time;
        determining if the another printer device which received the job is non-functional; and
        printing the job at the another printer device when the another printer device is functional.

2. The method as set forth in claim 1 wherein the at least one criteria is which of the plurality of printer devices can complete the job in the shortest amount of time.

3. The method as set forth in claim 1 further comprising determining which of the plurality of printer devices are available, wherein the determining which one of a plurality of printer devices satisfies at least one criteria is determined from the plurality of printer devices which are determined to be available.

4. The method as set forth in claim 1, wherein the providing comprises the printer devices communicating directly with each other without an intermediate server.

5. A computer readable medium having stored thereon instructions for balancing a workload between a plurality of printer devices which when executed by a processor, causes the processor to perform the steps of:

providing a plurality of printer devices coupled together, wherein each printer device includes a printer controller adapted to interactively communicate with other printer devices;

receiving a request for printing a job at a printer device in the plurality of printer devices; and determining with the printer controller in the printer device where the request is received whether the job can be shared based upon a confidential nature of the job, wherein the determining further comprises:

printing the job with the printer device where the request is received when the job cannot be shared, identifying which one of the plurality of printer devices satisfies at least one criteria when the job can be shared, and routing the job to another printer device which satisfies the criteria, wherein the identifying which one of the plurality of printer devices satisfies at least one criteria further comprises:

determining if one or more job sharing rules has been satisfied, wherein the job sharing rules comprise:

determining if the job would exceed a maximum for a work queue at the another printer device which received the job;

determining if the job would take longer to complete than a first period of time;

determining if the another printer device which received the job is non-functional; and printing the job at the another printer device when the another printer device is functional.

6. The medium as set forth in claim 5 wherein the at least one criteria is which of the plurality of printer devices can complete the job in the shortest amount of time.

7. The medium as set forth in claim 5 further comprising determining which of the plurality of printer devices are available, wherein the determining which one of a plurality of printer devices satisfies at least one criteria is determined from the plurality of printer devices which are determined to be available.

8. The medium as set forth in claim 5, wherein the determining comprises the printer devices communicating directly with each other without an intermediate server.

9. A workload balancing system comprising:

a plurality of printer devices coupled together, wherein each printer device includes a printer controller adapted to interactively communicate with other printer devices, wherein a printer device in the plurality of printer devices is configured to receive a request for printing a job at the printer device, the printer controller in the printer device where the request is received is configured to determine whether the job can be shared based upon a confidential nature of the job and print the job with the printer device where the request is received when the job cannot be shared;

a job processing system in at least one of the plurality of printer devices that identifies which one of a plurality of printer devices satisfies at least one criteria when the job can be shared;

a routing system in the at least one of a plurality of printer devices that routes the job to another printer device which satisfies the criteria; and a rules system that determines if one or more job sharing rules has been satisfied by the another printer, wherein the job sharing rules comprise:

determining if the job would exceed a maximum for a work queue at the another printer device which received the job;

determining if the job would take longer to complete than a first period of time;

determining if the another printer device which received the job is non-functional; and printing the job at the another printer device when the another printer device is functional.

10. The system as set forth in claim 9 wherein the at least one criteria is which of the plurality of printer devices can complete the job in the shortest amount of time.

11. The system as set forth in claim 10 further comprising an availability system that determines which of the plurality of printer devices are available, wherein the job processing system determines which one of the plurality of printer devices satisfies the at least one criteria from the plurality of printer devices which are determined to be available.

12. The system as set forth in claim 9, wherein the plurality of printer devices are configured to communicate directly with each other without an intermediate server.

\* \* \* \* \*